United States Patent [19]
McEligot

[11] Patent Number: 5,583,512
[45] Date of Patent: Dec. 10, 1996

[54] OPTIMAL AMBIGUITY FUNCTION RADAR

[75] Inventor: E. Lee McEligot, Newport Beach, Calif.

[73] Assignee: Point Loma Industries, Inc., San Diego, Calif.

[21] Appl. No.: 468,023

[22] Filed: Jun. 6, 1995

[51] Int. Cl.$^6$ ............................ G01S 7/292; G01S 7/36
[52] U.S. Cl. .................................... 342/189; 342/17
[58] Field of Search .................... 342/189, 16, 17, 342/18, 19, 196

[56] References Cited

U.S. PATENT DOCUMENTS

| | | | |
|---|---|---|---|
| 4,042,925 | 8/1977 | Albanese et al. | 342/132 |
| 4,176,351 | 11/1979 | DeVita et al. | 342/111 |
| 4,184,154 | 1/1980 | Albanese et al. | 342/107 |
| 4,285,048 | 8/1981 | Casasent et al. | 364/822 |
| 4,580,139 | 4/1986 | Weathers et al. | 342/189 |
| 5,151,702 | 9/1992 | Urkowitz | 342/134 |
| 5,289,188 | 2/1994 | Chudleigh, Jr. | 342/58 |

*Primary Examiner*—John B. Sotomayor
*Attorney, Agent, or Firm*—Leo R. Carroll

[57] ABSTRACT

This radar incorporates a single channel, two-dimensional correlator, providing simultaneous correlation in the range/doppler plane. In conventional radar processors, separate channels are used to measure range and doppler. Range track is normally established first and the range signal is then used to enable, or correlate with the doppler channel. In this invention, this correlation is performed simultaneously in a single channel and truly represents the combined ambiguity function, rather than an attempt to merge two separate ambiguity functions. A purely random sequence of binary bits (+1 and −1's) is used to control the phase of each segment in the transmitted signal (either pulse or CW) as opposed to systems using pseudo-random sequences generated by various means such as linear shift register generators. A digital random number generator is used to produce a set of purely random numbers which, when applied to a rule, generates a random sequence of binary bits, plus or minus 1's (±1's), which is used to bi-phase modulate the carrier frequency. The rule used is: if $n(i) \geq 0.5$, then p=1; if $n(i) < 0.5$, then p=−1; and p=a random sequence of + or −1's (ones). The resulting phase modulated signal is amplified and sent to the transmit antenna.

13 Claims, 7 Drawing Sheets

OPTIMAL AMBIGUITY FUNCTION RADAR

BACKGROUND OF THE INVENTION

1. Technical Field

This invention relates generally to radar systems, and particularly to those systems in which radar performance is not limited by internal noise, but rather by external sources such as electronic countermeasures (ECM) or by clutter arising from echoes from the land and/or sea. The proposed invention concerns the improvement in a radar system's ability to detect, distinguish and use target signals embedded in such ECM or clutter, by means of a correlation radar which employs a transmitter modulating function with a near optimum or optimal correlation function, which results in an optimal ambiguity function.

When operating in an ECM environment and/or in a background of land and/or sea clutter, performance improvements will be in obtained in both continuous wave (CW), and in pulse radar (PR) radar systems. Particular applicability will be found in: high, medium and low PRF pulse doppler (PD) radars used in search, acquisition and tracking radars; and in missile borne semi-active or active CW or pulse doppler radar homing seekers.

2. Background Art

The theory regarding the detectability of radar signals in noise has been well developed and is described at length in the open literature. Early references include:

1.) "Radar Systems Engineering", Ridenour, L. N. MIT Radiation Laboratory Series, McGraw-Hill Book Co., N.Y., 1947
2.) "Radar Systems Analysis", Barton, D., Prentice-Hall Inc., Englewood Cliffs, N.J., 1964
3.) "Radar Handbook", Skolnick, M. I., McGraw-Hill Book Co., N.Y., 1970
4.) Berkowitz, R. S., "Modern Radar Analysis, Evaluation, and System Design", John Wiley & Sons, Inc., N.Y., 1965.

The theory for the improvement of radar performance in a background of ECM or clutter is also well developed. This theory is concerned with target resolution, that is, separation of targets one from another and separation of targets embedded in a background of clutter or ECM. In radar signal analysis, this theory is described as 'Ambiguity Theory' in, for example, references 3 and 4 above. Reviewing this material, one finds that much of the literature associated with optimum receivers is concerned with signal detection and target resolution in range and velocity. The following review of these concepts will aid in the understanding of this invention.

The initial consideration is that of signal detectability, or receiver sensitivity. If an optimum detection procedure is used, the sensitivity of a radar receiver depends only on the total energy of the received signal and not on its form. It is the energy density spectrum of the signal with respect to the energy density spectrum of the noise which determines the receiver's sensitivity.

Measures of resolution are not so easily perceived, except for simple waveforms. In a simple pulse radar, the resolving power of the transmitted pulse depends on the pulse duration. The narrower the pulse, the more closely two targets may approach each other in range before their echoes merge. From Fourier transform theory, we know that the narrower a pulse becomes, the broader its spectrum becomes. Thus range resolution is inherently inversely proportional to signal bandwidth. However, it has been shown in Reference 4 above, that it is the 'effective' signal bandwidth that determines the range resolution properties of a signal. That is, signal duration is not directly involved in range resolution. Long duration and high bandwidth are not incompatible if a signal has rapid and/or irregular changes in its structure. In a like manner, the literature shows that velocity (doppler) resolution is inversely related to the signal 'effective' duration.

FIG. 1 shows an example of delay and doppler ambiguity surfaces for monochromatic pulses. The central peak of the ambiguity function in the range direction will be narrow if the bandwidth is high, i.e. the greater the bandwidth the better the range resolution; and the central peak in the doppler direction will be narrow if the duration is long, i.e. the longer the duration the better the doppler resolution. A good rule is that the range resolution is approximately equal to 1/bandwidth and doppler resolution is approximately equal to 1/duration.

Radar ambiguity theory thus involves optimization of the Range-Velocity (t, $f_d$) ambiguity function to yield optimal resolution of signals in the t, $f_d$ domain. The ideal ambiguity function is shown to resemble a thumbtack, that is it has a single spike at the origin ($t_0$, $f_0$) and is zero elsewhere. The receiver must process the signal in a manner such that both the range delay t and doppler frequency shift $f_d$ are determined. Due to noise $t_1$ and $f_1$ for any specific target can only be estimated. The literature shows that the very best that any receiver can do is to determine the probability that $t_1=t_0$ and $f_1=f_0$ for all measured paired values of t and $f_d$. Once these probabilities are determined and presented at the receivers output, decisions can be made as to which specific paired values represent targets of interest. Thus, the ideal receiver must determine the joint probability density distribution of t and $f_d$ given the received signal $e_R(t)$. One desirable output for such a receiver is shown in FIG. 2. The shape of this probability density distribution is important because it describes the resolution capability of the system. The shape can be controlled by controlling the shape of the transmitted signal, that is, by controlling the modulation function.

Receivers that measure the joint probability density distribution are not realizable in a practical sense. Fortunately this joint probability density distribution has been shown in the literature to be linearly related to the envelope of the cross correlation function of the received and transmitted signals, provided that certain conditions are fulfilled. These conditions require:

a. the probability that a target has range delay $t_1$ and doppler shift $f_1$ is equal for all t and $f_d$ within a band of interest and is zero outside of that band.

b. the output of the receiver be examined by a threshold device which determines the values of t and $f_d$ where the threshold has been exceeded. Condition a. requires that the target range and velocity, although not known are bounded. Condition b. specifies a simple and desirable (and conventional) receiver output processor.

Most radar receivers that operate in real time take advantage of this property of the cross correlation function and are designed to correlate the received signal with a delayed replica of the transmitted signal. This is particularly true for coherent systems such as doppler radars. The correlator is then followed by a threshold detector which determines the values of t and $f_d$ for which the threshold has been exceeded.

Thus the ideal realizable receiver for a radar system concerned with measurement of target range and doppler is a single channel, two-dimensional correlator that cross correlates the received signal with a delayed replica of the transmitted signal and maximizes the cross correlation function for the selected modulation function.

It was indicated above that the radar as a system must be optimized from the system viewpoint, i.e. the transmit and receive functions must be considered together. In the concepts reviewed above, it was shown that a receiver may be synthesized to provide optimum performance for any given modulation function. However, careful selection of the transmitter modulating function can maximize the peak of the joint ambiguity surface, and the goal is to strive to get as close as possible to the ideal ambiguity surface (a single, sharp central peak in the t, $f_d$ plane). This, we have shown, requires the effective signal bandwidth to be as large as possible to provide a sharp peak in the range dimension, and the signal duration must be long to provide a sharp peak in the frequency dimension (i.e., for good doppler resolution). Both of these conditions can be met using conventional spread spectrum waveforms. Selection of a special version of such a transmitted waveform has in turn led to the invention of a very simple processor providing the desired signal correlation which gives optimal range and doppler resolution.

Spread spectrum waveforms have been used for over 30 years in radar systems, and more recently in communication systems. The principle efforts in the radar field have been to extend the original linear-FM (chirp) waveforms developed at Bell Laboratories by using waveforms that have many of the desirable properties of the chirp waveforms. For example, the original chirp waveform was an intrapulse FM where the carrier frequency was swept linearly during the pulse 'on-time'. More recent applications have used an inter-pulse FM sweep where longer modulation time periods and greater FM deviations are realized. These linear FM sweeps have been realized using either phase modulation or conventional FM techniques.

In an recent alternate approach, Walker, in U.S. Pat. No. 5,32,1409, describes a radar system utilizing chaotic coding, in which the code sequence is a series of numbers generated by a chaotic mapping difference equation. Such sequences are nonperiodic and unpredictable, while being readily correlatable. The random coding method of this invention however, uses random numbers, not those generated by a mapping procedure as for the chaotic codes.

Much of the literature is devoted to the analysis and application of pseudo-random sequences as modulating functions in spread spectrum radars and communication systems. Recent examples of these systems include U.S. Pat. No. 5,291,202 for Noise Radars to McClintock, in which a continuous transmitted signal is phase coded in pseudo-random sequences of long durations, such as 10,000 bits. The driving force behind such systems is perhaps the ease with which the pseudo-random sequences can be generated using digital processing techniques. Such a sequence can be generated using a shift register. Maximal length sequences are developed using various feedback connections. The maximal length sequences possess many of the properties of the linear-FM modulation functions and have good correlation functions, i.e., they can be made to significantly improve the ambiguity function from those systems not using pseudo-random sequences.

A problem with such pseudo-random sequences is remembering the very long sequences and providing appropriate delays to implement the required cross correlation of the target return signal with a delayed replica of the transmitted signal. The problem is obviously manageable, but requires computer memory and adequate speed to operate in real time. Another problem with pseudo-random sequences is that high sidelobes can appear sporadically in the recovered or correlated signal. The position of the sidelobes in the frequency spectrum is a function of the feedback connections on the shift register used to generate the pseudo-random sequence. Different feedback arrangements can be found to shift these sidelobes from one frequency position to another but the sidelobes are not eliminated. As will been seen below however, an optimal ambiguity function radar may be obtained by using a purely random sequence with uniformly distributed and very low level sidelobes in its correlation function, resulting in near optimum suppression of unwanted signals such as clutter.

SUMMARY OF THE INVENTION

The proposed invention incorporates a single channel, two-dimensional correlator, providing simultaneous correlation in the range/doppler plane. Previously this type of receiver has only been synthesized using electro-optical techniques to provide the required simultaneous cross correlation. The optical correlators are bulky and complex, and do not operate in real time. The advent of modern high speed digital processors has allowed implementation of a more conventional correlator using digital signal processing techniques and circuitry. These same high speed digital techniques are used to generate a transmitter modulating function that yields a near ideal ambiguity function.

There is a subtle but significant difference between the proposed invention and conventional doppler radar processors. Conventional radar processors use separate channels to measure range and doppler. Range track is normally established first and the range signal is then used to enable (correlate with) the doppler channel. Here, this correlation is performed simultaneously in a single channel and truly represents the combined ambiguity function, rather than attempting to merge two separate ambiguity functions. The application of this type of processor represents a unique and ideal solution to the problem of resolution/discrimination of target signals in a background of ECM and clutter. The proposed invention overcomes these drawbacks by using a purely random sequence of unlimited length and arbitrarily large bandwidth. Thus, high frequency doppler resolution and very fine range resolution are realizable.

This invention uses a purely random sequence of binary bits (+1 and −1's) to control the phase of each segment in the transmitted signal (either pulse or CW) as opposed to previous systems using pseudo-random sequences generated by various means such as linear shift register generators.

A digital random number generator is used to produce a set of purely random numbers which, when applied to a rule, generates a random sequence of binary bits, plus or minus 1's (±1's), which is used to bi-phase modulate the carrier frequency. The rule used is: if $n(i) \geq 0.5$, then $p=1$; if $n(i)<0.5$, then $p=-1$; and p=a random sequence of + or −1's (ones). The resulting phase modulated signal is amplified and sent to the transmit antenna.

When the signal is reflected from a moving target, the doppler shifted signal is received in the receiving antenna and passed to a mixer where it is mixed with a range delayed replica of the transmitted signal. An I.F. offset is usually added for processing convenience. The mixing process, combined with a filter function, performs the cross correlation between the transmitted and received signals.

The output of the correlator will be essentially zero until the delay, in the L.O. branch, equates to the target range in the time domain. The doppler signal will thus be coherently processed at this time. For all other target ranges the output of the correlator will be essentially zero.

The prime objective of this invention is to provide all the advantages of a spread spectrum radar described above, while eliminating the aforementioned drawbacks and disadvantages.

Another objective includes achievement of a near optimum ambiguity function, thus optimally suited to pulse doppler radar applications.

The following paragraphs will describe one embodiment of this processor which meets the above objectives. In addition, other objects, features and advantages of the present invention will become more apparent from this description when making reference to the accompanying sheets of drawings.

DESCRIPTION OF THE PREFERRED EMBODIMENT

Figure 1:
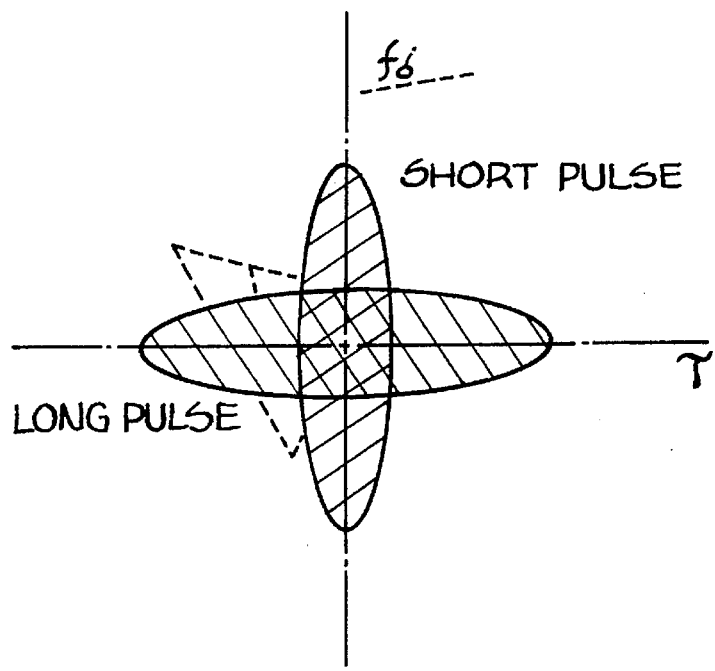
FIG. 1 shows an example of delay and doppler ambiguity surfaces for monochromatic pulses.
Figure 2:
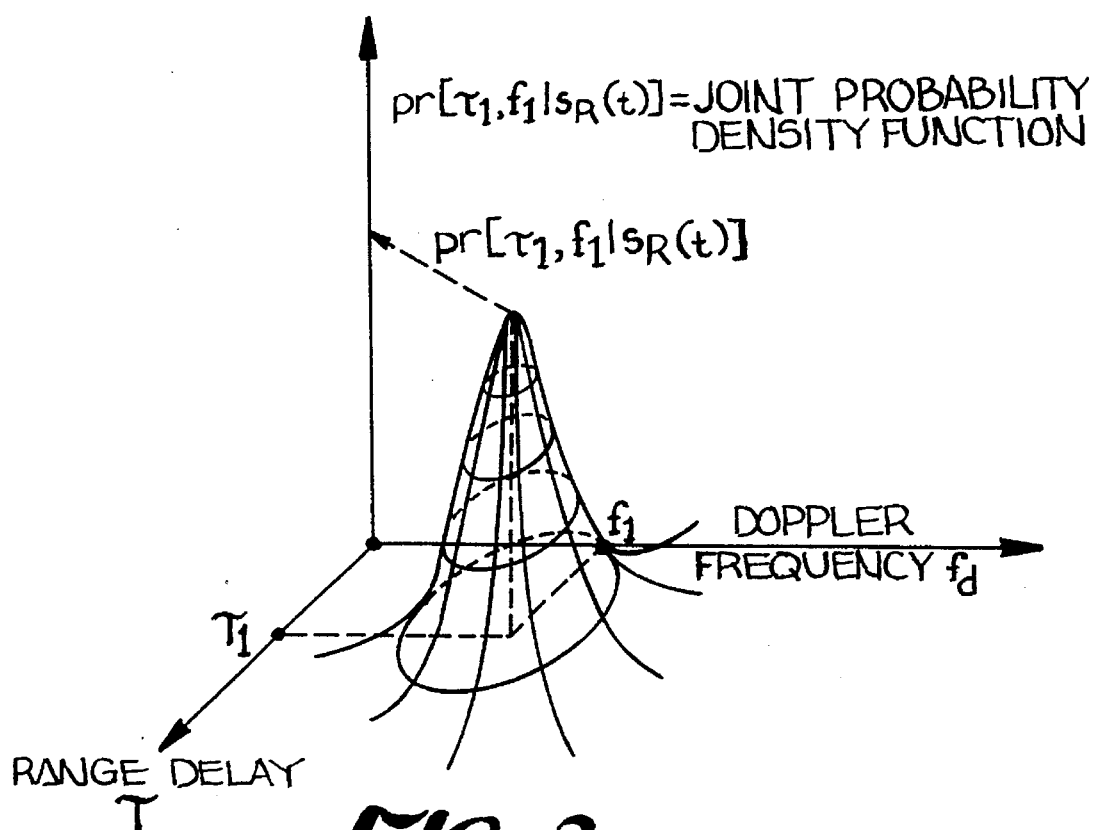
FIG. 2 depicts one desirable output for the ideal receiver.
Figure 3:
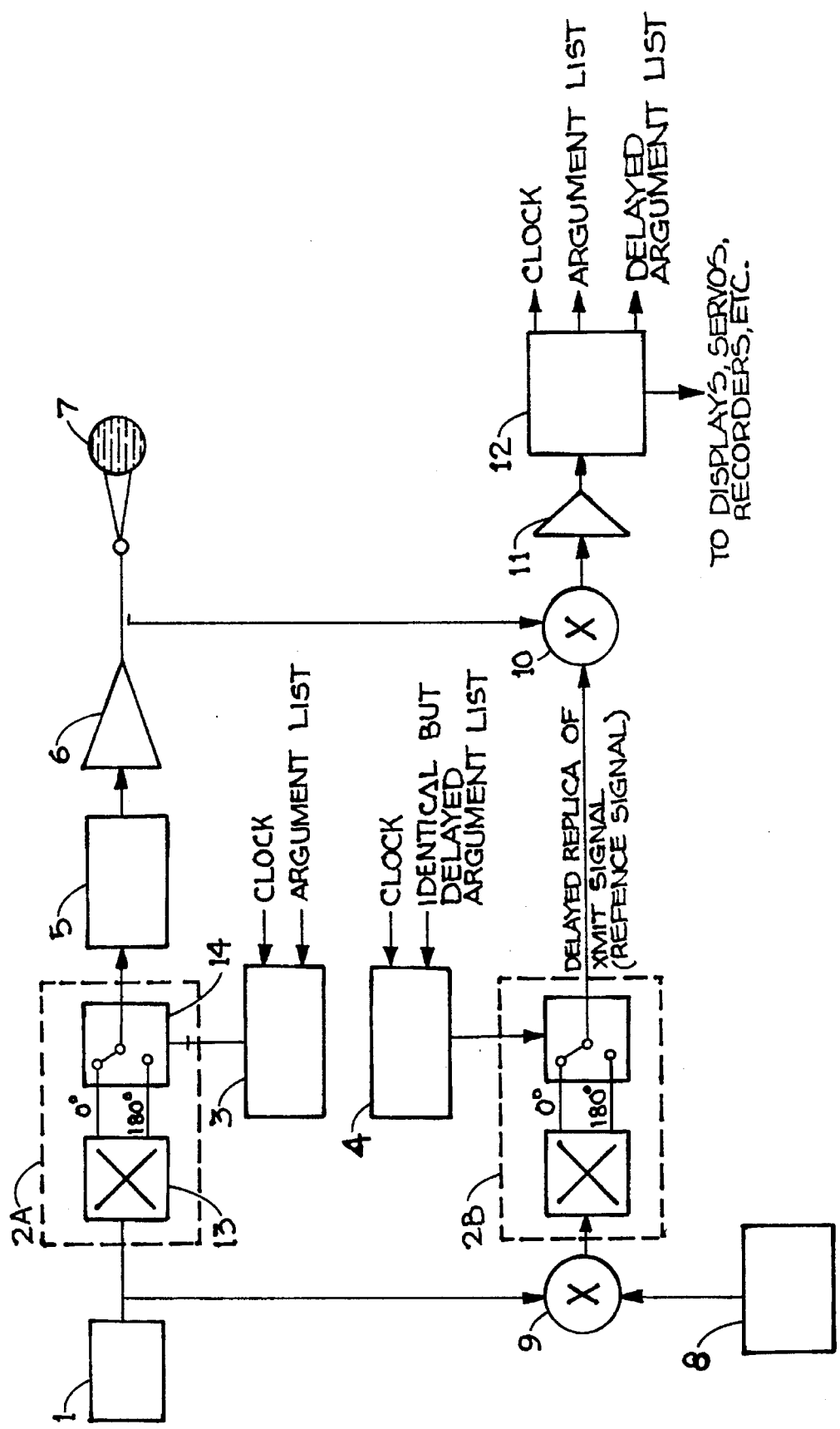
FIG. 3 is a block diagram showing the principle functional elements comprising the Optimal Ambiguity Function Radar.

FIG. 3 shows the block diagram for a two dimensional correlator configured in accordance with this invention. Referring to this figure, stable source 1 provides means for generating the transmit carrier signal. This carrier signal is passed to a bi-phase modulator 2A comprised of a 180 degree hybrid phase splitter 13 and a switch matrix 14 used to select alternatively the hybrids' in-phase (zero degree) component or the out-of-phase (180 degree) component, as a function of the state of the random sequence generator 3 being +1 or −1. Thus the output of the switch matrix 14 is a transmit signal of zero degree phase or 180 degrees phase respectively.

Figure 4A:
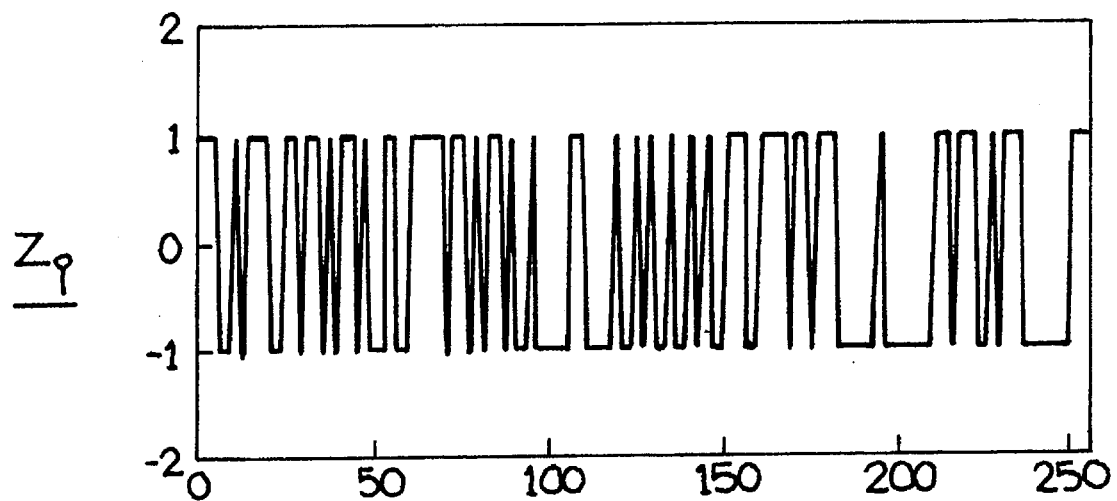
FIG. 4A shows a typical purely random coded sequence of binary bits.

The random sequence generator 3 is a digital, purely random number generator that produces a new random number in the range 0.0 to 1.0 each time the argument is changed. FIG. 4A shows such a sequence. The random number will repeat itself each time the argument is repeated, i.e. random (100) =0.XXXXX will always be the same every time the argument (100) is used. The random number generator is clocked by the receiver computer 12 and is sequentially stepped through a list of arguments of arbitrary length. For example we can require the random number generator to generate random numbers for each value of (n) as (n) steps sequentially through the range from (n)=1 to 1024, or (n)=1 to 4096 or any other arbitrary set of values for the argument. Random (n) will thus produce a purely random number for each value of (n) and the sequence of random numbers will repeat when the sequence (n) is repeated. The output of the random number generator is applied to the rule: (If $n(i) \geq 0.5$ then p=+1; If $n(i)<0.5$ then p=−1; p is then a purely random sequence of binary bits + and −1s). The output of this generator is then used to control switch matrix 14 which results in bi-phase modulation of the stable source signal, which is then passed to optional pulse modulator 5, then to power amplifier 6 and finally to antenna 7 for radiation into space.

The bi-phase modulators 2A and 2B shown in FIG. 3 produce phase shifts of 0 degrees and 180 degrees to modulate the transmitter. It is evident that any other binary set of phase shifts could be used, such as, 90 degrees and 270 degrees or 0 degrees and 90 degrees or any combination of arbitrary phase shifts that will produce sufficient phase deviation of the transmitter carrier frequency to obtain the spread spectrum bandwidth required for the desired range resolution.

Of course, it is also evidence that the transmitter could be bi-frequency modulated rather than bi-phase modulated by toggling between two arbitrary frequencies f1 and f2 depending on whether the purely random sequence of binary bits is + or − one(1), where df=f2−f1 is chosen to provide the required spread spectrum bandwidth needed to obtain the desired range resolution.

Figure 4B:
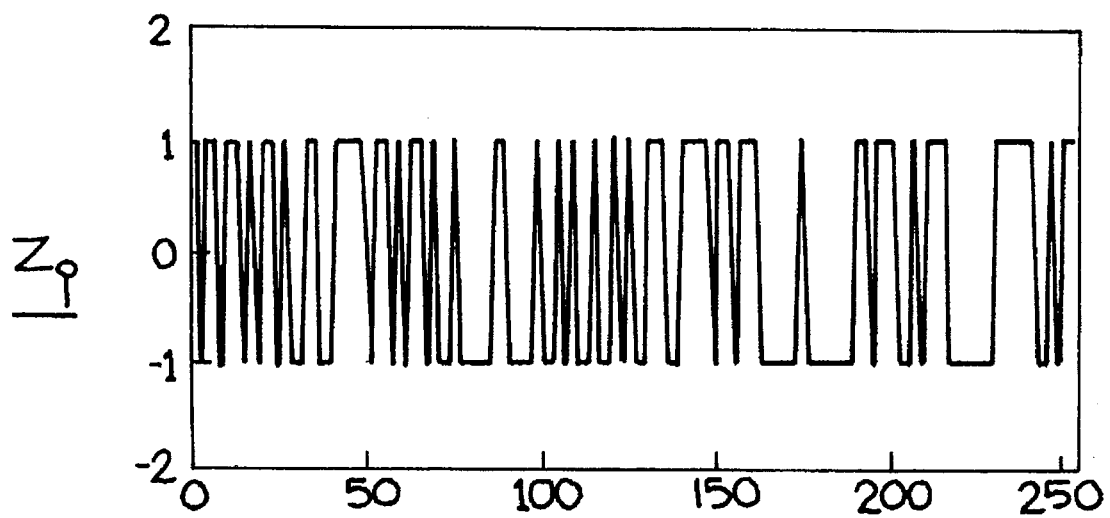
FIG. 4B shows the purely random coded sequence of FIG. 4A delayed 10 steps.

The unique range delay function is implemented by using a random number generator 4, identical to the one used as described above. The range delay is implemented by starting the argument sequence at some arbitrary point in the argument sequence corresponding to an expected target range. This point may be programmed by sweeping to accommodate a range search. A delayed replica of the sequence sent to bi-phase modulator 2A will thus be sent to bi-phase modulator 2B. FIG. 4B depicts such a sequence with a ten (10) step delay.

The output of 2B will be a replica of the stable source 1 offset with an I.F. difference frequency by local oscillator 8, and is heterodyned with stable source 1 in mixer 9, thus carrying a delayed replica of the purely random code placed on the transmit signal in the paragraph above.

The received signal, which may be collected in the same antenna 7 as the transmit signal for a monostatic pulsed system or in a separate antenna for a CW, or bistatic system, is passed to the mixer 10 where it is heterodyned with the delayed replica of the transmit signal referred to as the referenced signal, and then passed to a filter amplifier 11. This process of mixing or hetrodyning and filtering performs the simultaneous correlation of the received and reference signal in the range and doppler (t, $f_d$)domain. Note that there has been no specific range gating or doppler gating prior to this simultaneous single channel correlation.

The output of the correlator will be essentially zero until the delay in the L.O. branch reference signal, equates to the target range in the time domain. The target doppler signal will be coherently processed through the correlator at this time. For all other target ranges the output of the correlator will be essentially zero. The output of the filter amplifier 11 is passed to the receiver 12 for range and angle tracking. Note that this filter function may be implemented in the computer for convenience.

In this embodiment, it should be noted that there are no practical hardware limits on the length of the Code, thus there are no corresponding limits on the doppler frequency resolution and unambiguous range which may be realized. Further, there is no practical limit on the length of each code element. As the length (time duration) of each code element becomes smaller and smaller the signal bandwidth increases and the range resolution capability and unambiguous doppler bandwidth increases correspondingly. There is no practical limit on the signal bandwidth used because all of the wide bandwidth requirements are contained in the r.f. elements, namely the power amplifier 6, antenna 7 and first mixer 10. These elements easily result in 5% to 10% bandwidths which are very large compared with the required doppler information bandwidth.

In an alternate embodiment of the invention, the reference signal delay may be realized by incorporating the sequence of purely random numbers or the purely random sequence of binary bits into a look-up table and clock through the table, thus generating the required purely random sequence used to modulate the transmitter. An identical table may be entered at an arbitrary address representing the required range delay and clocked to output the purely random sequence required to modulate the local oscillator signal.

Figure 5:
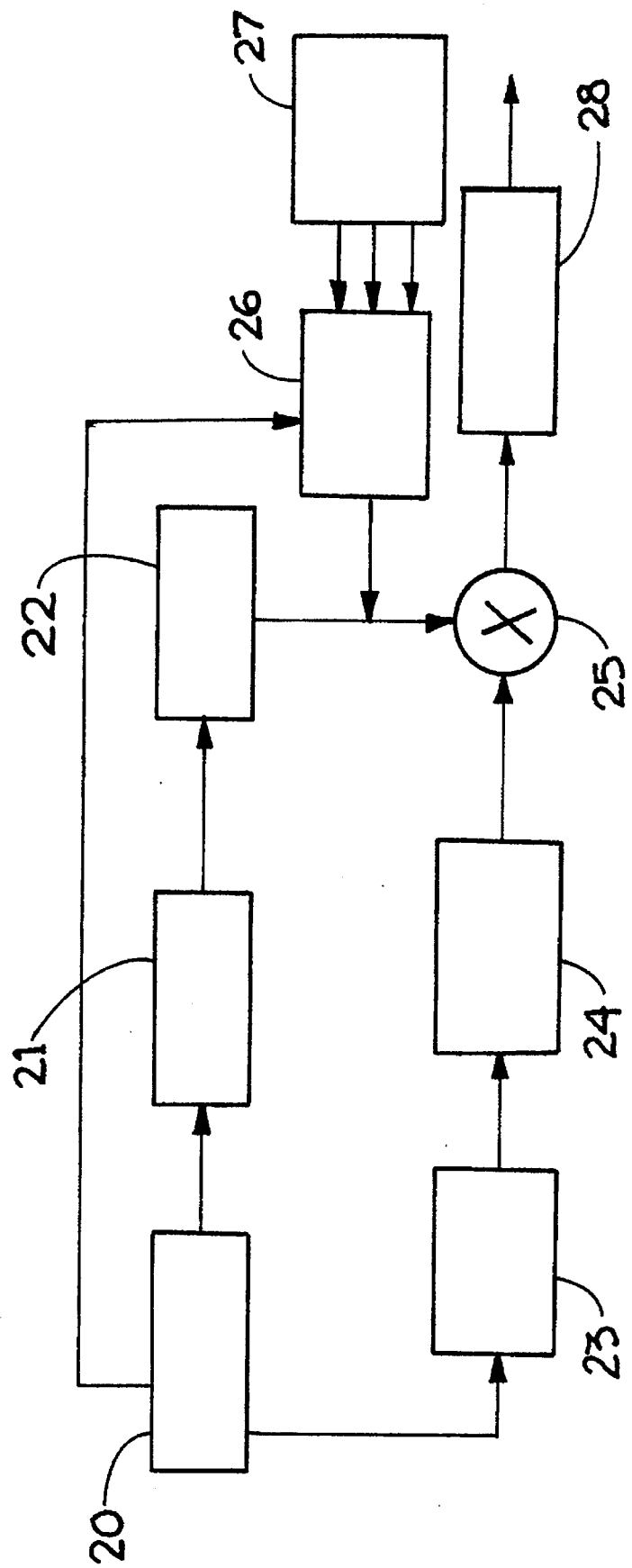
FIG. 5 illustrates a block diagram of a computer simulation of the invention.
Figure 5A:
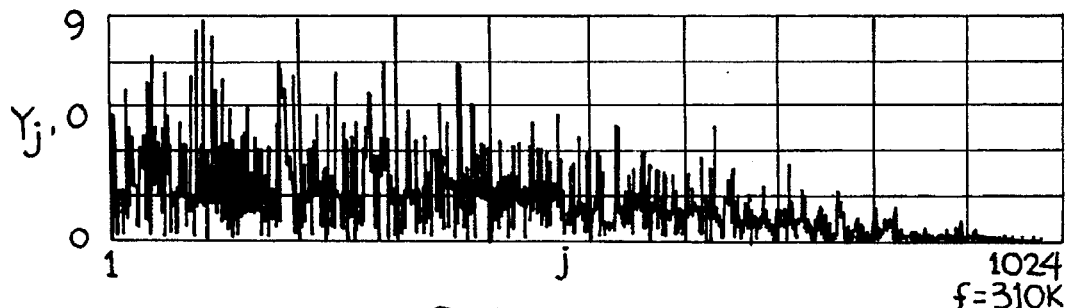
FIG. 5A displays the spectrum of a purely random coded sequence.
Figure 5B:
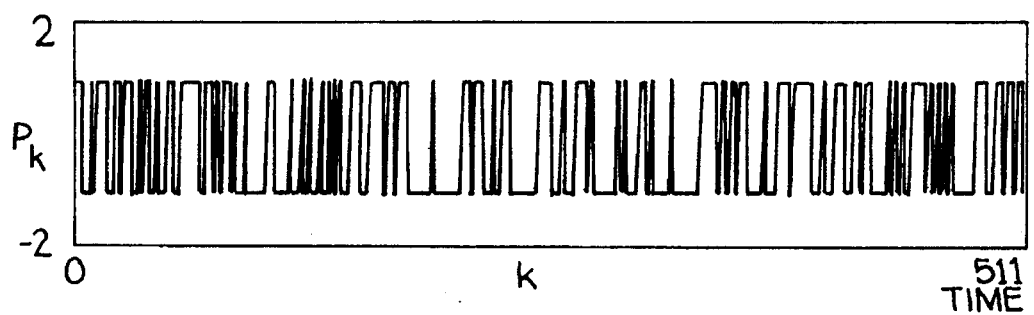
FIG. 5B shows the time waveform of the signal associated with FIG. 5A.

A proof of concept simulation of the proposed optimal ambiguity function radar has been developed. FIG. 5 presents a block diagram of the simulation implemented. This simulation includes the modulation function generator 20, which is used to modulate the transmitter 21, a description of the return signal from a moving target 21, an clutter spectra generator 27, generated off-line and imported and added to the target signal prior to the first mixer 25. The first mixer 25 and local oscillator 24 were simulated and the range gating function 23 was added as a delay to the L.O. signal. The output of the mixer was then sent to a Fast Fourier Transform (FFT) 28 for frequency analysis.

FIGS. 5 through 9 below provide views of key signals at various points in the simulation.

FIG. 5 is a shows the spectrum and time waveform of a purely random coded sequence of 1024 binary bits.

Figure 6:
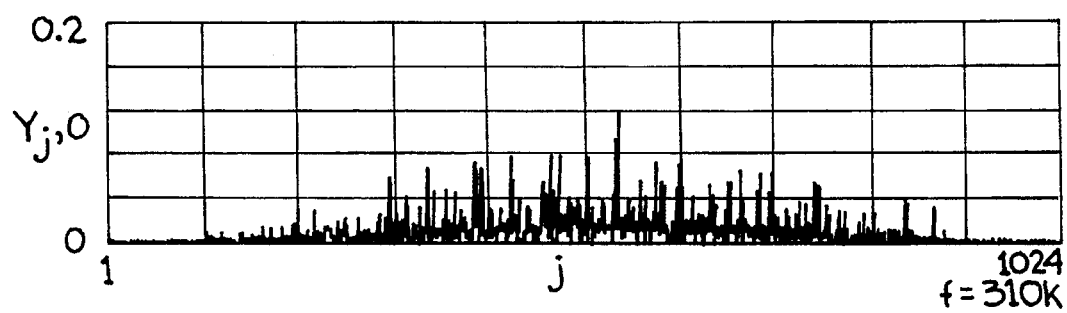
FIG. 6 presents the spectrum of the transmitted waveform when modulated with a purely random sequence of 1024 binary bits.

FIG. 6 presents the spectrum of the transmitted waveform when modulated with a purely random sequence of 1024 binary bits.

Figure 7A:
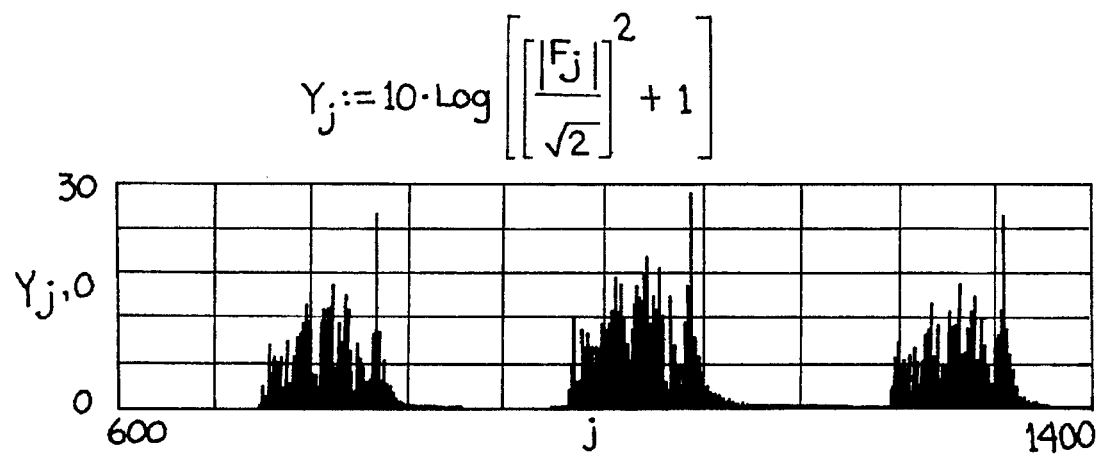
FIG. 7A displays the spectrum of a doppler signal embedded in sidelobe clutter for an outgoing target.
Figure 7B:
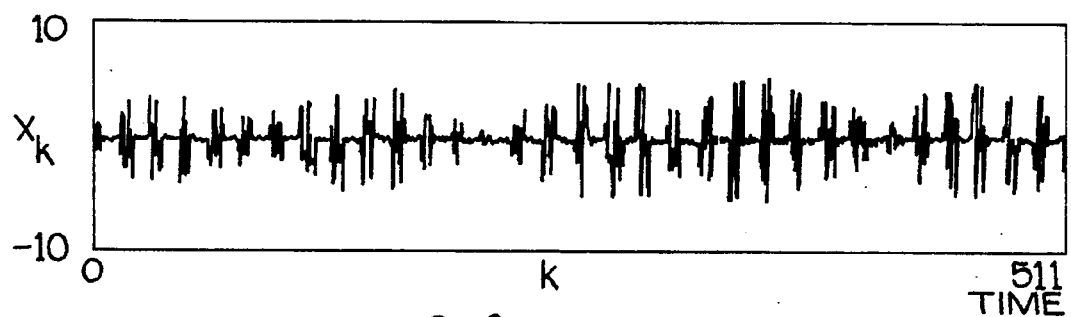
FIG. 7B shows the time waveform of the signal associated with the spectrum of FIG. 7A.
Figure 7C:
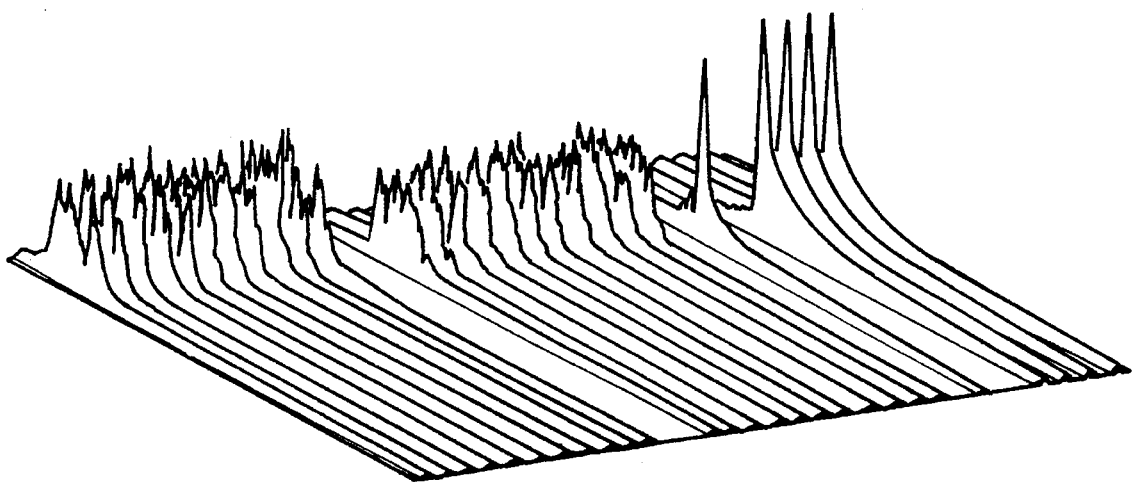
FIG. 7C presents the clutter and signal spectrum in the $\tau, f_d$ plane with clutter distributed in range and an outgoing target.

FIG. 7, illustrates the spectrum and time of a doppler signal embedded in sidelobe clutter for an outgoing target.

Figure 8A:
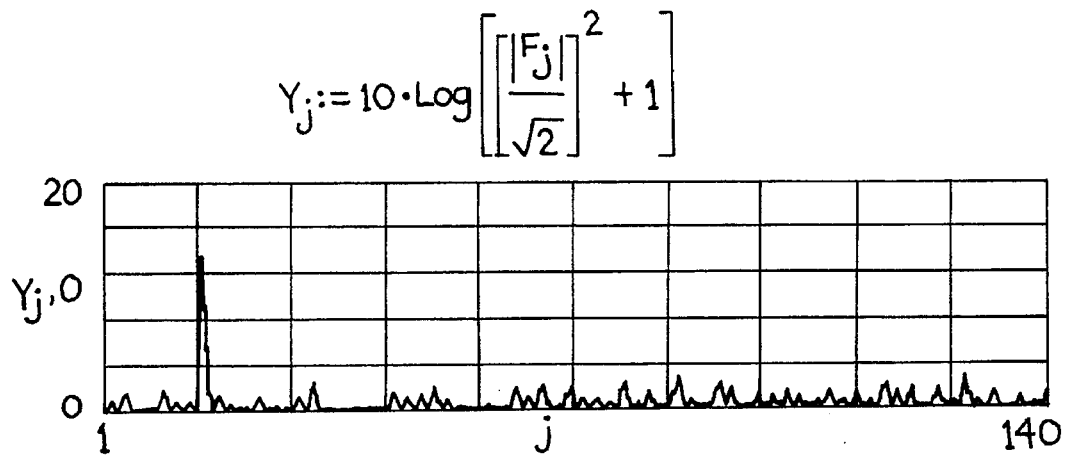
FIG. 8A shows the baseband spectrum of the doppler signal with clutter at the output of the correlator.
Figure 8B:
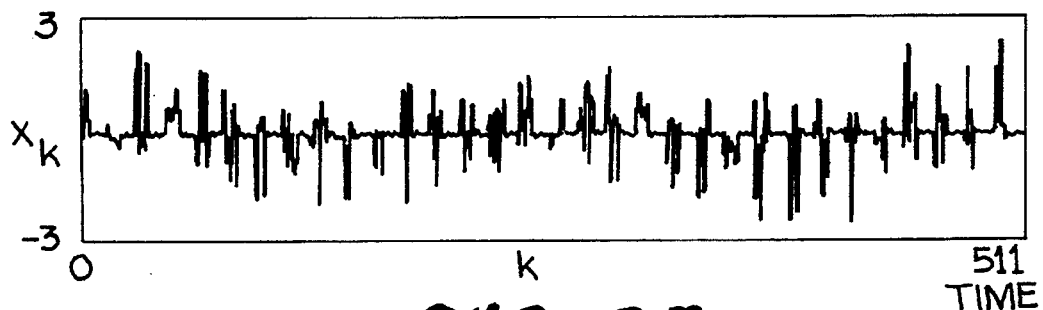
FIG. 8B presents the time waveform of the doppler signal at the output of the correlator.

FIG. 8 shows a spectrum and time waveform of a doppler signal at the output of the correlator.

Figure 9:
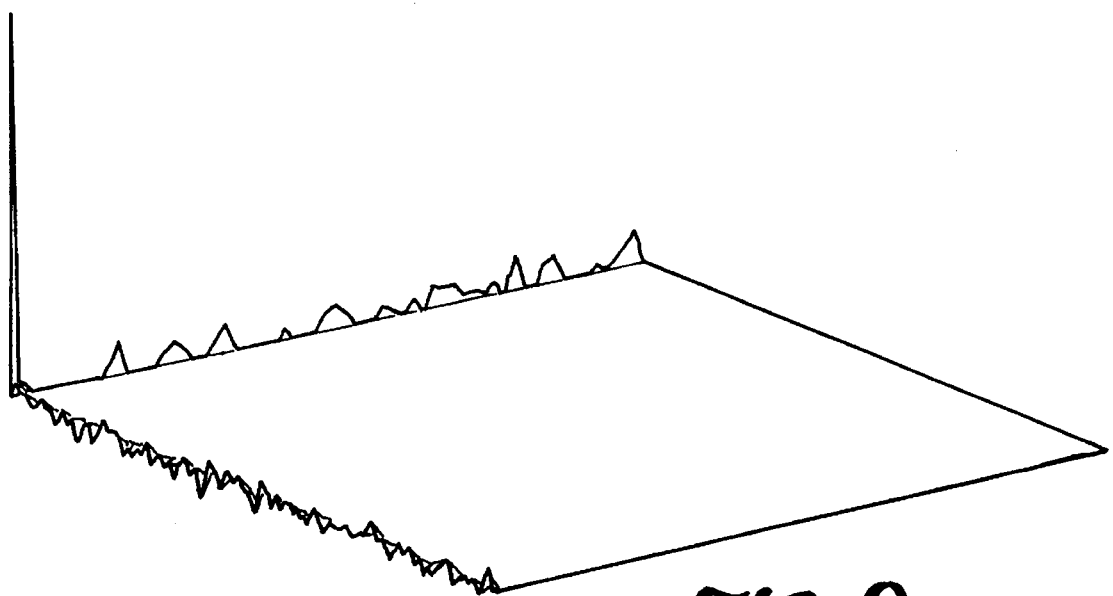
FIG. 9 depicts the Optimal Ambiguity function in the $t_1$, $f_d$ domain.

FIG. 9 depicts an optimal ambiguity function in pi, $f_d$ plane.

Comparisons of FIGS. 7 and 8 show an improvement in signal to clutter ratio of greater than 20 db. FIG. 8 demonstrates the dramatic difference between the Optimal Ambiguity Function Radar and other spread spectrum, noise-like radars using pseudo-random codes. The pseudo-random coded radars result in high "sidelobes" appearing sporadically in the recovered baseband spectrum. FIG. 8 shows a relatively uniform and low level of "schedule" or clutter energy in the recovered spectrum.

The 20 db improvement is estimated by comparing the signal to peak clutter ratio in FIG. 7 to the signal to average clutter level in the recovered spectrum FIG. 8. This is only an estimate in that the signal and clutter amplitudes presented in the fft are only approximate and can vary considerably depending upon whether or not the signal frequency components line-up properly with the FFT bins.

The basic concepts of the techniques and apparatus for this invention have been illustrated herein and the spirit and scope of the appended claims should not necessarily be limited to those preferred versions.

I claim:

1. An optimal ambiguity function radar for determining the range and velocity of an external object, comprising:

means for generating a transmitter modulating function with a near ideal correlation function derived from a purely random binary code sequence;

means for modulating the transmitter with said function;

means for transmitting the modulated signal in space;

means for receiving a signal reflected from said external objects;

means for correlating the received signal in a single channel with a delayed replica of the transmitted signal;

means for adjusting the delay of the replica to maximize the output of the single channel correlator means in two dimensions; and means to examine the output of the single channel, two dimensional correlator means, to determine the range and velocity of said external objects.

2. The optimal ambiguity function radar as recited in claim 1, wherein the transmitter radiates a cw waveform.

3. The optimal ambiguity function radar as recited in claim 1, wherein the transmitter radiates a pulsed waveform.

4. The optimal ambiguity function radar as recited in claim 2, wherein the transmitter radiates an interrupted continuous waveform.

5. A radar according to claim 4 in which the time sequence of the continuous wave interruptions is also purely randomly modulated.

6. A radar according to claim 1 wherein the radar transmitter is phase modulated by the purely random binary code sequence, said phase modulation being 0° or 180° based on whether the purely random sequence of binary bits is −1 −1 respectively.

7. A radar according to claim 6 wherein the phase modulation is 90° or 270° based upon whether the purely random binary code sequence is +1 or −1 respectively.

8. A radar according to claim 7 wherein the radar transmitter is phase modulated by the purely random binary code sequence whereby—said modulation is $$+ \text{or} - \left[ 180° - \text{arc Cos} \frac{(N-1)}{(N+1)} \right]$$

where N is the number of bits in the sequence and the + or − phase deviation is based on whether the purely random sequence of binary bits is + or − one (1) respectively.

9. A radar according to claim 7 wherein the radar transmitter is phase modulated by the purely random binary code sequence whereby—said modulation is $$0° \text{ or } \left[ 180° - \arccos \frac{(N-1)}{(N+1)} \right]$$

where N is the number of bits in the sequence and the + or − phase deviation is based on whether the purely random sequence of binary bits is + or − one (1) respectively.

10. A radar according to claim 7 wherein the transmitter is phase modulated + or − an arbitrary amount, the phase deviation being + or − based on whether the purely random sequence of binary bits is + or − one (1) respectively.

11. A radar according to claim 1 wherein the radar transmitter is frequency modulated by a fixed frequency step, the transmitted frequency being $f_1$ or $f_2$ based on whether the purely random sequence of binary bits is + or − one (1) respectively.

12. A radar according to claim 1 where the purely random sequence has a uniform distribution.

13. A radar according to claim 1 wherein the purely random sequence of binary bits is normally distributed.

\* \* \* \* \*